US008687861B2

(12) United States Patent
Shu (10) Patent No.: US 8,687,861 B2
(45) Date of Patent: Apr. 1, 2014

(54) IMAGE RECONSTRUCTING METHOD USING X-RAY VOLUME PHOTOGRAPHY

(76) Inventor: Jia Shu, Chengdu (CN)

( * ) Notice: Subject to any disclaimer, the term of this patent is extended or adjusted under 35 U.S.C. 154(b) by 768 days.

(21) Appl. No.: 12/679,680

(22) PCT Filed: Aug. 4, 2008

(86) PCT No.: PCT/CN2008/001417
§ 371 (c)(1),
(2), (4) Date: Mar. 24, 2010

(87) PCT Pub. No.: WO2009/043224
PCT Pub. Date: Apr. 9, 2009

(65) Prior Publication Data
US 2010/0195891 A1    Aug. 5, 2010

(30) Foreign Application Priority Data

Sep. 24, 2007  (CN) .......................... 2007 1 0050094

(51) Int. Cl.
*G06K 9/00*  (2006.01)
*G06K 9/62*  (2006.01)

(52) U.S. Cl.
USPC .......................................... 382/128; 382/100

(58) Field of Classification Search
USPC ...................................................... 382/128
See application file for complete search history.

(56) References Cited

U.S. PATENT DOCUMENTS

| 6,289,235 | B1 | 9/2001 | Webber et al. |
| 2003/0139663 | A1 | 7/2003 | Graumann |
| 2004/0267112 | A1 | 12/2004 | Barth et al. |
| 2008/0089610 | A1* | 4/2008 | Tao et al. ...................... 382/285 |

FOREIGN PATENT DOCUMENTS

| CN | 1464301 | * 12/2003 | ............. G01N 23/04 |
| CN | 1464301 A | 12/2003 | |
| CN | 101126725 | 2/2008 | |
| JP | 2003079616 | 3/2003 | |
| JP | 2004065706 A | 3/2004 | |
| JP | 2005021345 A | 1/2005 | |

* cited by examiner

*Primary Examiner* — Tran Nguyen
(74) *Attorney, Agent, or Firm* — Fay Sharpe LLP (57) ABSTRACT

A 3D image reconstructing method using X-ray volume photography acquires a plurality of X-ray area array images of the object interested according to locating principle of the digital photographic measurement. A plurality of mark points of the known 3D positions are simultaneously taken in the X-ray photo, and the method uses the coordinates of the mark points in the rectangular coordinate system for volume photographic 3D image reconstruction and the coordinates of the mark points in the X-ray photo coordinate system to construct a transforming relationship of the two coordinate systems. The method determines the path and the position of each X beam by using the transforming relationship and gets all voxels of each X-ray passing the object interested. The method uses the voxel g and the pixel G of the same X beam path to get Radon set of equations to determine the gray scale value of voxel g, then determines the gray scale values of all voxels g by computer and reconstructs a 3D volume image of the object interested based on the gray scale value of voxel g.

3 Claims, 10 Drawing Sheets

IMAGE RECONSTRUCTING METHOD USING X-RAY VOLUME PHOTOGRAPHY

TECHNICAL FIELD

The present invention relates to the technical field of image reconstructing, and in particular, to an image reconstructing method of the internal state of an object.

BACKGROUND OF THE INVENTION

Figure 1:
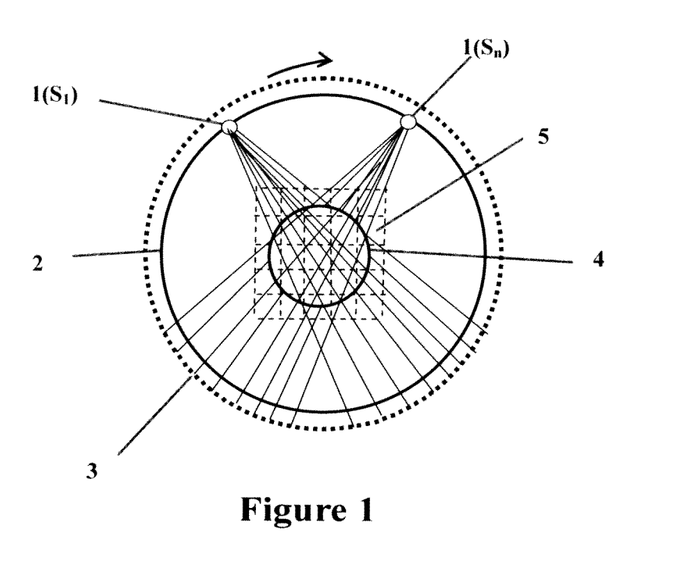
FIG. 1 is a schematic diagram of Computend Temography (CT).
Figure 2:
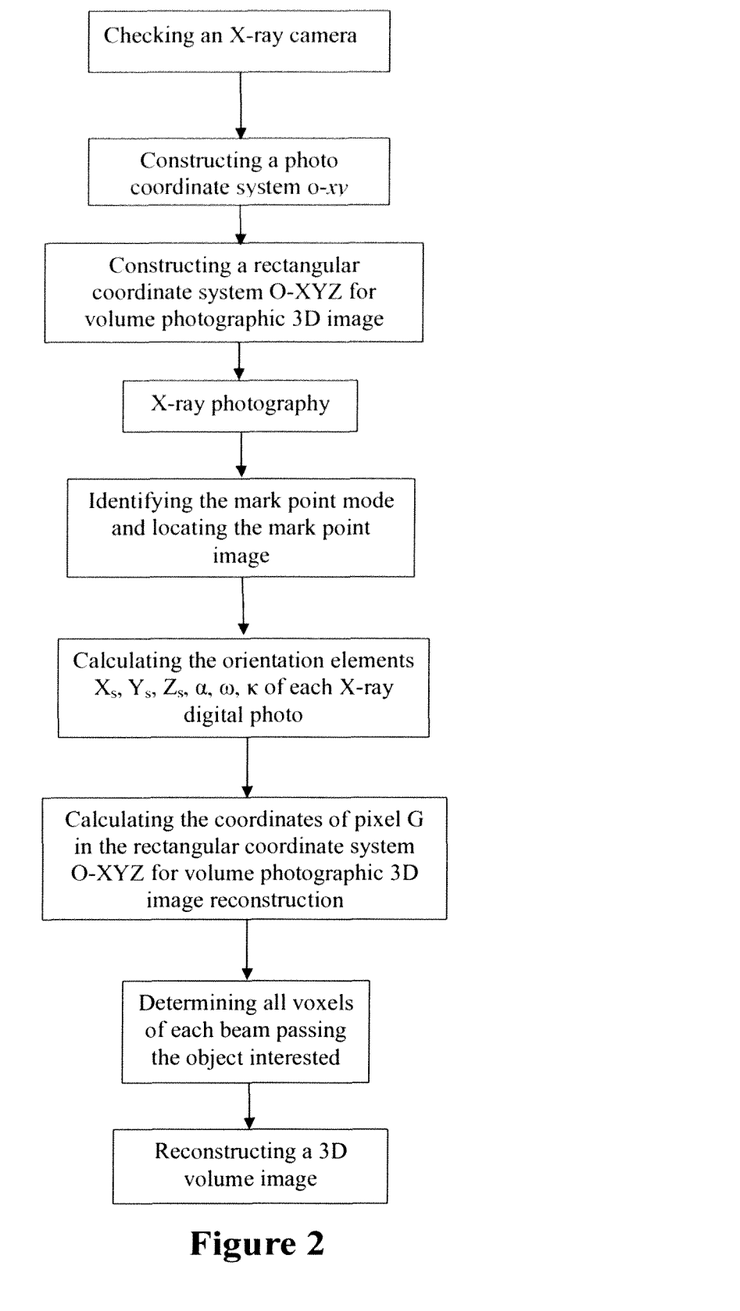
FIG. 2 is a flow chart of image reconstructing method using X-ray volume photography according to the present invention.
Figure 3:
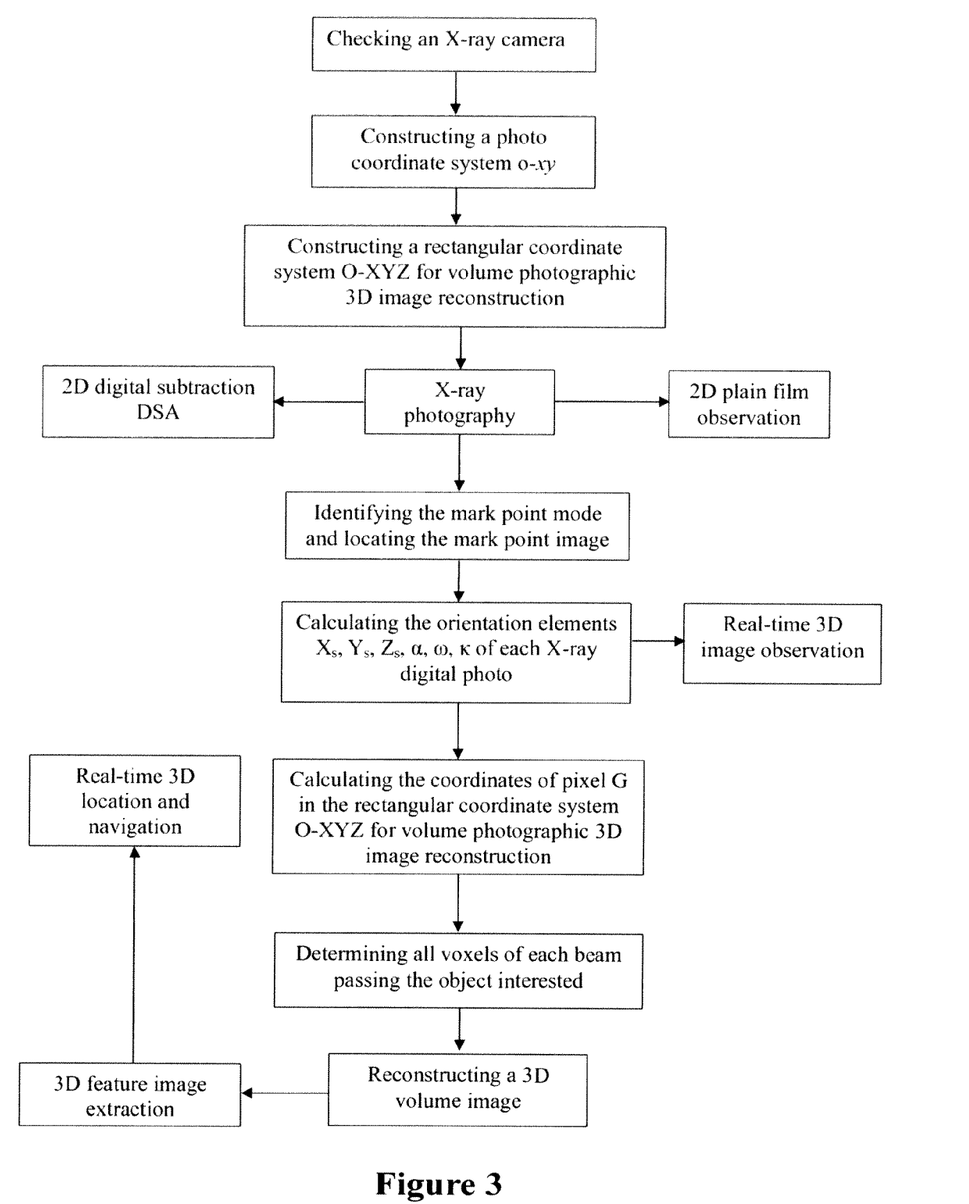
FIG. 3 is a schematic drawing of use of image reconstructing method using the X-ray volume photography according to the present invention.

Nowadays, regarding the image reconstruction of the internal state of an object, it mainly uses the method invented by Hounsfield for CT (Computend Temography) scanning, that is, disposing X-ray source 1 and detector 3 (as shown in FIG. 1) on a precision machinery scanning gantry to enable X-ray source 1 and detector 3 to surround object (an object interested) 4 for rotary scanning, precisely determining the sending position and the receiving position of each beam of X-ray during rotation, and realizing the image reconstruction by using Radon calculating method which solves the internal density distribution of an object (reference books: *Computend Temography*, by U.S. Willi A. Kalender, published by People's Medical Publishing House, ISBN7-117-05284-8/R.5285; *Practical CT Examination Technology*, by Mingpeng Wang, published by Science and Technology Document Publishing House, ISBN7-5023-3262-6/R.656).

Since the first CT machine came out in 1972, CT machine has gone through the development of eight generations ("generation" is the mark for its developing process, essentially for how to enhance the scanning speed), however, the locating principle of scanning has not been changed, which uses the mode of scanning faultage data with precise machinery frame slip ring or beam bell-shaped device all the time. Such locating, scanning manner simulating the Radon calculating condition limits the composition of CT equipment and sufficient utilization of the parts of the equipment, which results in: complexity in manufacturing the scanning machinery and the electronic devices, large amount of X-ray exposure, low utilization rate, low speed in data collecting, low precision in data scanning, low resolution in image reconstructing, and no real 3D image being created.

SUMMARY OF THE INVENTION

The objective of the present invention is to overcome the shortages of the current scanning technology, providing an image reconstructing method using X-ray volume photography. This method reconstructs 3D image of the object interested by obtaining a planar-shaped X-ray photographic image, divides the 3D image into faultage images in any direction, which delivers not only a high image resolution and little X-ray exposure but also equipment with simple structure and low difficulty and investment in manufacturing.

The technical solution of the present invention is: acquiring data of a plurality of X-ray area array images by taking photos of an object interested according to the locating principle of digital photographic measurement, when taking an X-ray photo, simultaneously taking a plurality of mark points of which the 3D positions are known in an X-ray photo, using coordinates of mark points in the rectangular coordinate system O-XYZ for volume photographic 3D image reconstruction and coordinates of mark points in an X-ray photo coordinate system o-xy to construct a transforming relationship of These two coordinate systems, determining path and position of each X-ray photographic beam by using This transforming relationship, obtaining all voxels of each X-ray passing the object interested, determining the gray scale value of the voxel g by solving the Radon equation set based on a voxel g and a pixel G on the same X beam path, calculating the gray scale values of all voxels g by a computer, reconstructing a 3D volume image of the object interested based on the gray scale values of the voxels g.

The image reconstructing method using X-ray volume photography of the present invention comprising the following steps in sequence:

(1) Checking the X-Ray Camera

Adjusting the X-ray camera to make the vertical beam of an X-ray tube center S perpendicular to the imaging surface of the X-ray digital photo, and then, measuring the distance H from the X-ray tube center S to the imaging surface of the X-ray digital photo.

(2) Constructing a Photo Coordinate System o-xy

Constructing a photo coordinate system o-xy on the X-ray digital photo, the origin o of the photo coordinate system being the pixel of the vertical beam of the X-ray tube center S on the X-ray digital photo, x axis of the photo coordinate system is the lateral arrangement direction of the pixels passing through the origin o of the photo coordinate system, y axis of the photo coordinate system is vertical arrangement direction of the pixels passing through the origin o of the photo coordinate system.

(3) Constructing the Rectangular Coordinate System O-XYZ for Volume Photographic 3D Image Reconstruction Disposing at least three mark points for the object interested and measuring in advance the 3D distances between every two mark points, taking an arbitrary mark point as the origin O of the coordinate system to construct the rectangular coordinate system O-XYZ for volume photographic 3D image reconstruction, storing the coordinates of each mark point in the coordinate system O-XYZ into the computer;

The mark points are disposed on the object interested or the mark frame which is disposed surrounding the object interested.

(4) X-Ray Photography

Operating the X-ray camera to make the X-ray tube and the imaging surface of the X-ray digital photo move along an arc-line or a straight-line track, taking X-ray digital photos of the object interested at sites with a fixed distance so as to obtain a plurality of X-ray digital photos of the object interested at different positions.

(5) Recognizing the Pattern of the Mark Points and Locating the Image of the Mark Points Inputting all the X-ray digital photos taken in step (4) into the computer, performing pattern recognition and image locating to the mark points for each X-ray digital photo by the computer to obtain coordinates x, y of each mark point in the o-xy coordinate system of each photo (see Chapter 4 to Chapter 6 in "Digital Photogrammetry" by Zuxun Zhang and Jianqing Zhang for "Mark Point Pattern Recognition and Mark Point Image Locating", published by Wuhan University Publishing House, in May, 2001, ISBN7-307003233-3/P.7);

The mark point pattern recognition is completed by matching a prepared mark point shape template image with a feature extraction image. Feature extraction is completed by various kinds of operators; since the geometrical shapes of mark points are different, the mark points with different shapes have different image features on X photo, therefore, feature extraction operators can be classified into operator for point feature extraction, operator for line feature extraction, and operator for plane feature extraction; the operator for point feature extraction mainly includes Moravec operator, Hannah operator and Forstner operator; the operator for line feature extraction mainly includes gradient operator, second-order differential operator, Gauss-Laplace operator (LOG operator), feature segmentation and Hough transform; plane feature extraction is mainly completed by image region segmentation, and the method of image segmentation mainly includes threshold method, region-growing method and cluster classifying method.

Locating image of the mark points refers to precisely determining mark point locating objective position in coordinate system o-xy of the X-ray digital photo, the mark point locating objective position is found in the extracted mark point shape region. The calculating method of pattern recognition at locating objective position is the same as the preceding feature extraction operator.

(6) Calculating the Orientation Elements $X_s, Y_s, Z_s, \alpha, \omega, \kappa$ of Each X-Ray Digital Photo obtaining collinear equations for the X-ray beams of all the mark points on each X-ray digital photo by the computer; for any mark point (for example, mark point A), its collinear equation of X-ray beam is as follows:

$$\left.\begin{array}{l} x = -H\dfrac{a_1(X_A - X_S) + b_1(Y_A - Y_S) + c_1(Z_A - Z_S)}{a_3(X_A - X_S) + b_3(Y_A - Y_S) + c_3(Z_A - Z_S)} \\ y = -H\dfrac{a_2(X_A - X_S) + b_2(Y_A - Y_S) + c_2(Z_A - Z_S)}{a_3(X_A - x_S) + b_3(Y_A - Y_S) + c_3(Z_A - Z_S)} \end{array}\right\} \quad (1\text{-}1)$$

In the above equations, x, y are coordinates of mark point A in photo coordinate system o-xy, H is the distance from X-ray tube center S to an imaging surface of X-ray digital photo, $X_A, Y_A, Z_A$ are coordinates of the mark point A in the rectangular coordinate system O-XYZ for volume photographic 3D image reconstruction, $X_S, Y_S, Z_S$ are coordinates of the X-ray tube center S in the rectangular coordinate system O-XYZ for volume photographic 3D image reconstruction. The twiddle factor is:

$$\begin{pmatrix} a_1 & a_2 & a_3 \\ b_1 & b_2 & b_3 \\ c_1 & c_2 & c_3 \end{pmatrix} = \qquad (1\text{-}2)$$

$$\begin{pmatrix} \cos\alpha & 0 & -\sin\alpha \\ 0 & 1 & 0 \\ \sin\alpha & 0 & \cos\alpha \end{pmatrix} \begin{pmatrix} 1 & 0 & 0 \\ 0 & \cos\omega & -\sin\omega \\ 0 & \sin\omega & \cos\omega \end{pmatrix} \begin{pmatrix} \cos\kappa & -\sin\kappa & 0 \\ \sin\kappa & \cos\kappa & 0 \\ 0 & 0 & 1 \end{pmatrix}$$

Selecting collinear equations for the X-ray beams of at least three mark points on each X-ray digital photo for simultaneous solution to obtain the six orientation elements $X_S, Y_S, Z_S, \alpha, \omega, \kappa$ of each X-ray digital photo. In the orientation elements, $X_S, Y_S, Z_S$ are coordinates of the X-ray tube center S in the rectangular coordinate system O-XYZ for volume photographic 3D image reconstruction, $\alpha, \omega, \kappa$ are angles in rotation directions of the X-ray digital photo in the rectangular coordinate system for volume photographic 3D image reconstruction O-XYZ (see Chapter 1 of "Analytical Photogrammetry" by Zengbo Qian for the principle and arithmetic of "rotation factor" and "collinear equation", published by Surveying and Mapping Publishing House, 15039, new 143).

(7) Calculating the Coordinates of the Pixel G in the Rectangular Coordinate System O-XYZ for the Volume Photographic 3D Image Reconstruction.

According to the orientation elements $X_S, Y_S, Z_S, \alpha, \omega, \kappa$ of each X-ray digital photo obtained in step (6) and a corrected distance $H_{corrected}$ (the corrected distance $H_{corrected}$ is calculated by collinear equation 1-1 of X-ray beam of mark point on X-ray digital photo) from the X-ray tube center S to the imaging surface of the X-ray digital photo, a distance l between pixels, calculating the volume photographic 3D image reconstructing coordinates $X_{ij}, Y_{ij}, Z_{ij}$ of each pixel $G_{ij}$ on each X-ray digital photo by the computer using the calculation principle and method as follows:

The pixels on the X-ray digital photo are equidistantly arranged in order, the distance l between pixels G is fixed. The i, j are set as pixel sequence numbers, coordinate axes x, y of the photo coordinate system o-xy are set to be respectively parallel to the lateral direction and the vertical direction along which the pixels are arranged in order, photo coordinates x, y of each pixel $G_{ij}$ are set to be measured from intersection point o of the vertical distance from projection center S to photo P, the vertical distance from S to o is H. X photo coordinates of pixel $G_0$ at the position of the intersection point o are x=0, y=0. It can be seen from step (6) that, coordinates of X-ray tube center S in the rectangular coordinate system O-XYZ for volume photographic 3D image reconstruction are: $S(X_S, Y_S, Z_S)$, and when the calculated angle factors $\alpha, \omega, \kappa$ in rotation directions are introduced, the following equations are obtained:

Coordinates of pixel $G_0$ in the rectangular coordinate system O-XYZ for volume photographic 3D image reconstruction $$\left.\begin{array}{l} X_{G0} = X_s + (-H\cos\omega\sin\alpha) \\ Y_{G0} = Y_s + (-H\sin\omega) \\ Z_{G0} = Z_s (-H\cos\omega\cos\alpha) \end{array}\right\} \quad (1\text{-}3)$$

Coordinates of pixel $G_{ij}$ in the rectangular coordinate system O-XYZ for volume photographic 3D image reconstruction $$\left.\begin{array}{l} X_{Gij} = X_s + (-H\cos\omega\sin\alpha) + (i \times l)\cos\kappa \\ Y_{Gij} = Y_S + (-H\sin\omega) + (i \times l)\cos\kappa \\ Z_{Gij} = Z_S + (-H\cos\omega\cos\alpha) \end{array}\right\} \quad (1\text{-}4)$$

In the above equation, i, j are pixel sequence numbers, l is the distance between pixels, $i \times l = x_i$, $i \times l = y_i$. Equation (1-4) is represented as:

$$\left.\begin{array}{l} X_{Gij} = X_s + (-H\cos\omega\sin\alpha) + x_i\cos\kappa \\ Y_{Gij} = Y_S + (-H\sin\omega) + y_i\cos\kappa \\ Z_{Gij} = Z_S + (-H\cos\omega\cos\alpha) \end{array}\right\} \quad (1\text{-}5)$$

Coordinates of pixel $G_{ij}$ in the rectangular coordinate system O-XYZ for volume photographic 3D image reconstruction calculated by equation (1-5) are:

$$G_{ij}(X_{ij}, Y_{ij}, Z_{ij})$$

It can be seen that, what is represented by equation (1-3) and equation (1-4) together with equation (1-5) is a process of rearranging the coordinates (x, y) of pixel G on X-ray digital photo in the rectangular coordinate system for volume photographic 3D image reconstruction.

Through steps (1) to (7), coordinates of X-ray projecting center S and X-ray photo pixel G in the rectangular coordinate system for volume photographic 3D image reconstruction are obtained, obviously, positions of X-ray projecting center S and all pixels on X-ray digital photo are determined, the process of which is functionally identical with traditional CT precise machinery frame scanning, while a mechanical manner is used in traditional CT scanning to obtain the positions of X-ray projecting center S and X-ray receiver, while a calculation method is used in the present method to obtain the positions of X-ray projecting center S and all pixels on X-ray digital photo.

(8) Determining all Voxels of Each Beam Passing the Object Interested

According to the orientation elements $X_s$, $Y_s$, $Z_s$ of each X-ray digital photo obtained in step (6) and the volume photographic 3D image reconstructing coordinates $X_{ij}$, $Y_{ij}$, $Z_{ij}$ of each pixel G on each X-ray digital photo obtained in step (7), calculating by the computer to obtain all voxels g of each X beam passing the object interested using the calculating principle and method as follows:

linear equation constructed by a beam, formed by the two points, namely, X-ray tube center S and pixel $G_{ij}$, passing reconstructing voxel $g_{ijk}$ pane is:

$$\frac{X - X_S}{X_{G_{ij}} - X_S} = \frac{Y - Y_S}{Y_{G_{ij}} - Y_S} = \frac{Z - Z_S}{Z_{G_{ij}} - Z_S} \quad (1\text{-}6)$$

Therefore, the condition of determining X beam passing voxel $g_{ijk}$ is satisfying linear equation (1-6). To find out the position coordinates that satisfy voxel $g_{ijk}$ in linear equation (1-6) is to get the path that the beam passes.

Figure 7:
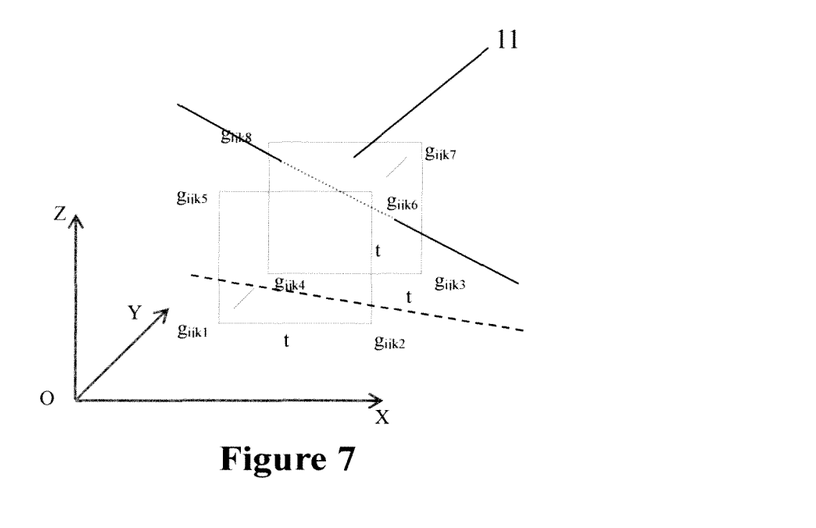
FIG. 7 is a relationship diagram between the voxel $g_{ijk}$, pane and the rectangular coordinate system O-XYZ for volume photographic 3D image reconstruction.
Figure 8:
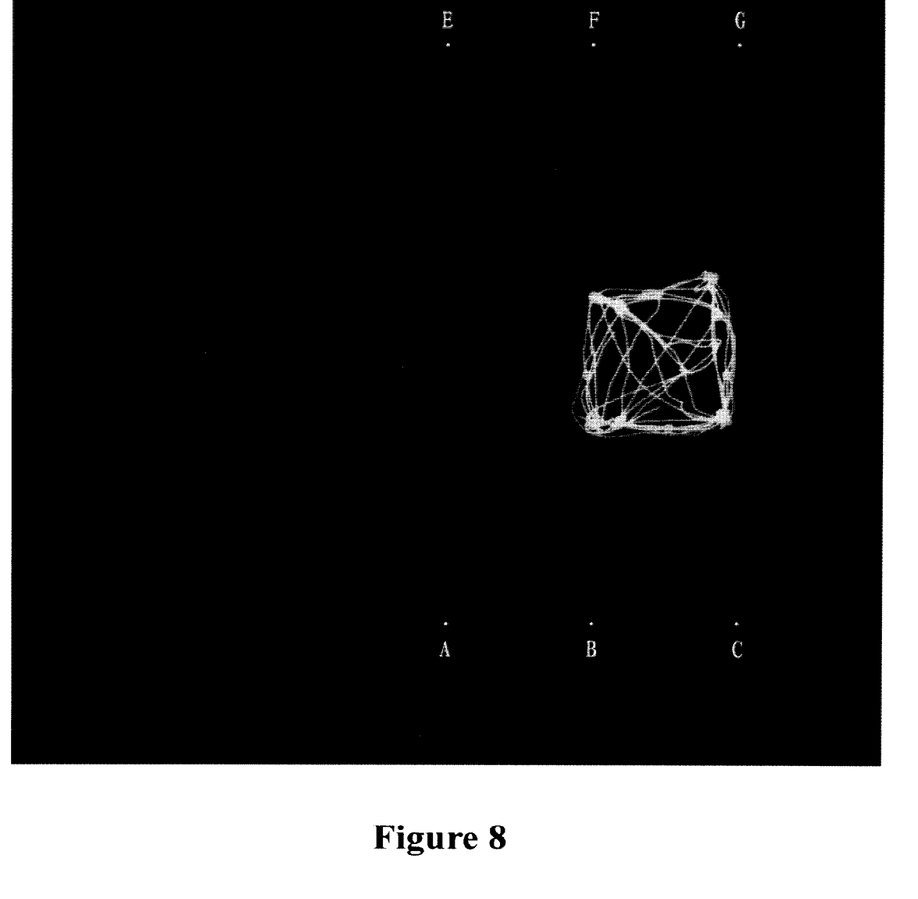
FIG. 8 is the first X-ray digital photo.
Figure 9:
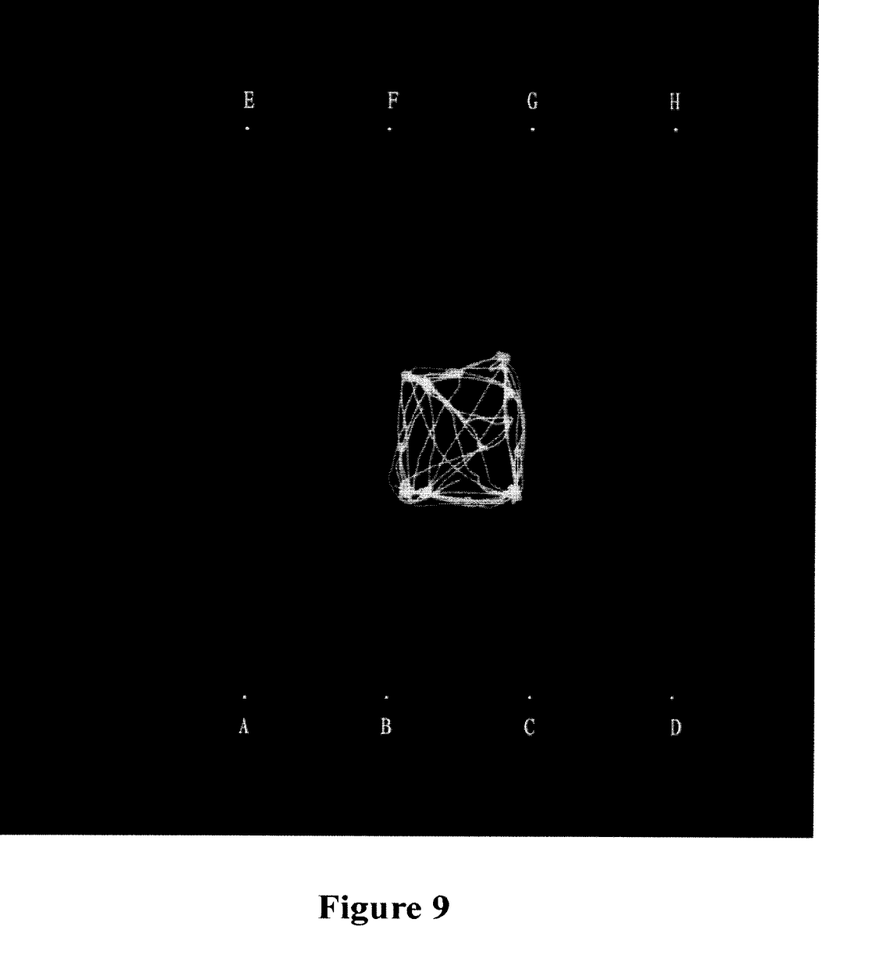
FIG. 9 is the second X-ray digital photo.
Figure 10:
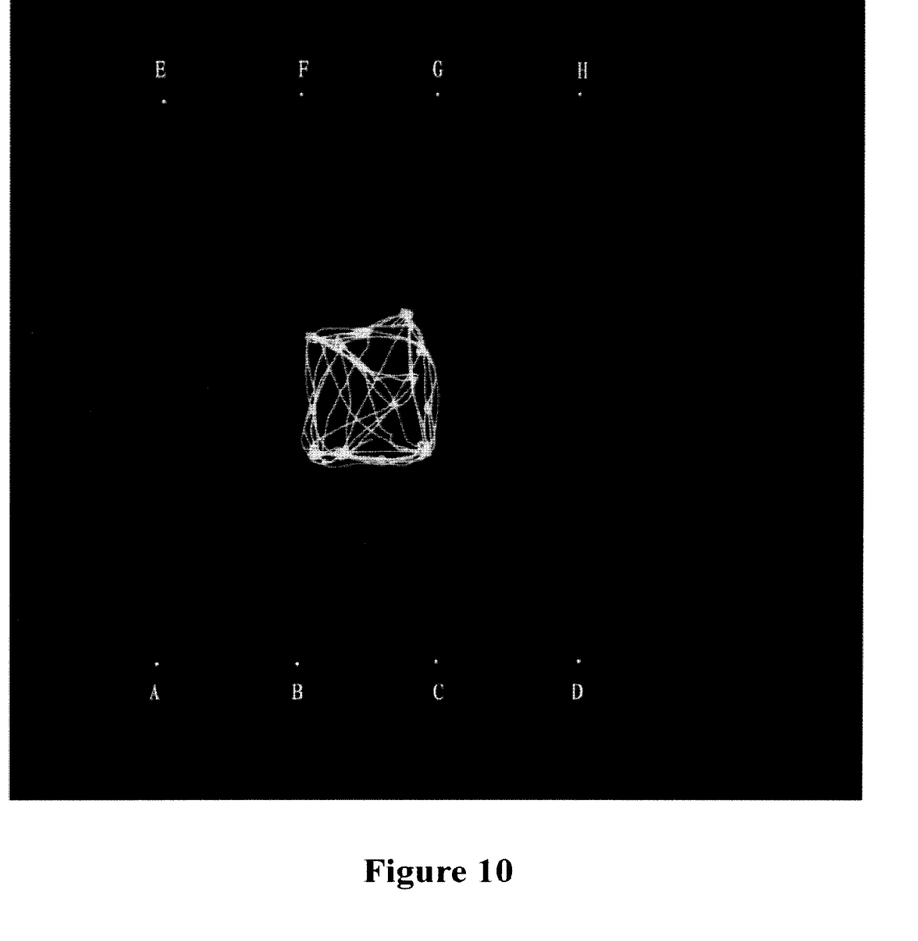
FIG. 10 is the third X-ray digital photo.
Figure 11:
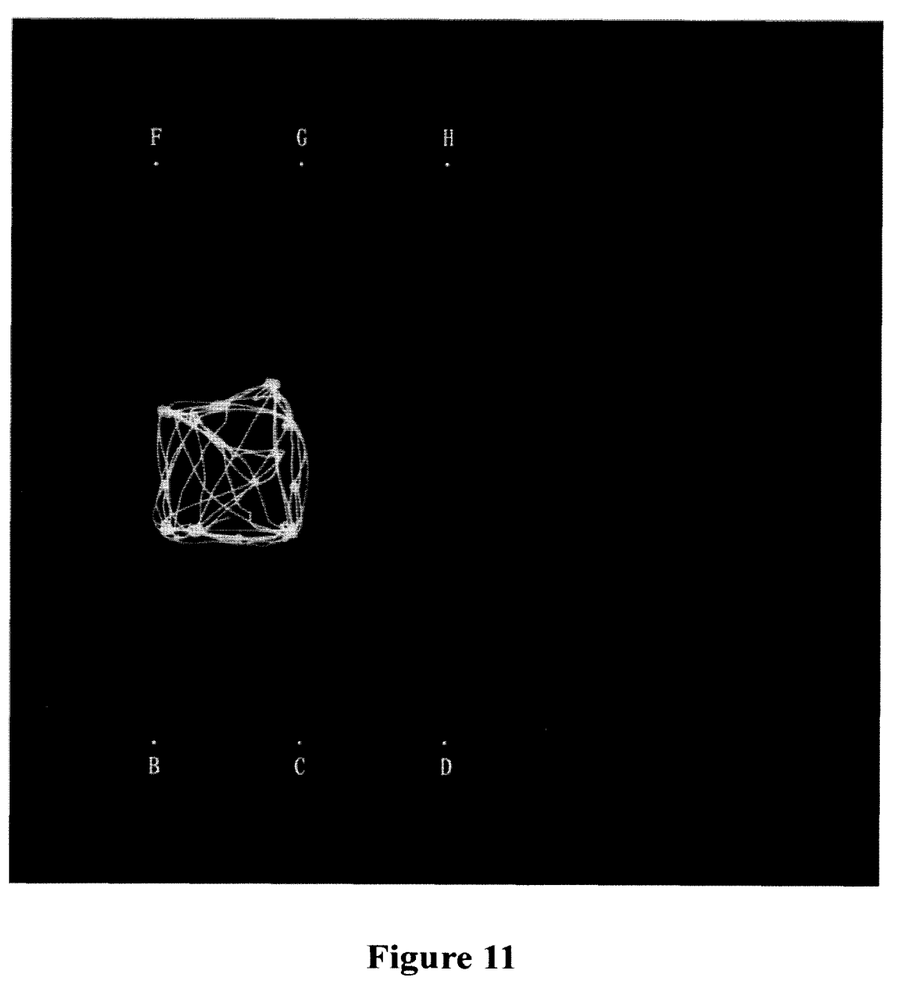
FIG. 11 is the fourth X-ray digital photo.

The determined dimension of voxel $g_{ijk}$ pane is: $g_{ijk} = |t \times t \times t|$, H the known coordinates of eight acmes of the voxel $g_{ijk}$ pane in the rectangular coordinate system for volume photographic 3D image reconstruction (see FIG. 7) are:

$g_{ijk1}$ ($X_{ijk1}$, $Y_{ijk1}$, $Z_{ijk1}$)

$g_{ijk2}$ ($X_{ijk2}$, $Y_{ijk2}$, $Z_{ijk2}$)

□ □ □

$g_{ijk8}$ ($X_{ijk8}$, $Y_{ijk8}$, $Z_{ijk8}$)

If the coordinate values of $g_{ijk}$, voxel calculated from equation (1-6) are limited within the range ($g_{ijk1}$, ... $g_{ijk8}$), it is considered that the X beam passes the voxel. To find out all voxels $g_{ijk}$ passed by each X beam $SG_{ij}$ is to determine the path of each beam.

Since the coordinates of the eight acmes of the voxel $g_{ijk}$ pane in the rectangular coordinate system for volume photographic 3D image reconstruction are known, for example, the coordinates of $g_{ijk1}$ are ($x_i$, $y_j$, $Z_k$), the steps of calculating the path of the beam are as follows:

□ the equation of X, Y obtained by inducing $Z = Z_k$ into equation (1-6) is the projection equation of the X beam within the elevation $Z = Z_k$ surface.

□ estimating whether the projection equation and the four sides at the bottom surface of the voxel pane intersect with each other. If they do not intersect, the X beam does not pass the voxel. If they do, the coordinates of the intersecting points shall be solved, which are set as ($a_1$, $b_1$) and ($a_2$, $b_2$), and further determination is required.

□ inducing the coordinates of the intersecting points in the second step into equation (1-6), respectively, to solve value Z, determining whether value Z is between $Z_K$ and $Z_K + t$ (t is the side length of the cube voxel pane). If it is, it means that the beam passes the voxel pane.

(9) Reconstructing a 3D Volume Image obtaining Radon equation set based on the voxel g and the gray scale value of the pixel G on each X beam path, calculating the gray scale values of all voxels g by the computer (Radon method is used for calculation of gray scale values of pixels), reconstructing the 3D volume image of the object interested based on the gray scale values of the voxels (reference book: see Chapter 7 in *Introduction to Digital Image Processing* by Rongchun Zhao, published by Northwestern Polytechnical University Publishing House, ISBN7-5612-0737-9/TB.82).

The method in the present invention has a plurality of uses:

1. 2D Plain Film Observation

What is obtained from the method step (4) of the X-ray photography in the present invention is a plurality of X-ray digital photos of the object interested at different positions. By the X-ray digital photos, 2D plain film observation can be conducted to the object interested.

2. 2D Digital Subtraction

After the X-ray strengthening photography, the photography gray scale of the X-ray digital photos obtained from the method step (4) of the present invention can be directly reversed and the X-ray digital photos are superposed with X photo to form a 2D digital subtraction image.

3. Real-time 3D Image Observation

According to the 3D observation principle, using two superposed X-ray digital photos taken at two different positions to enable the construction of body image pairs and conduct the real-time 3D observation to the object interested.

4. 3D Feature Image Extraction

In the 3D image reconstructed by the gray scale value of voxel $g_{ijk}$, the gray scale image coordinates of the parts with the same feature can be extracted to form a feature image picture observation.

5. Real-time 3D Locating and Navigating

Using the extracted gray scale image coordinates of the parts with the same feature to determine the spatial position of the objected interested and guide the equipment to arrive at the determined spatial position along the determined path coordinates.

6. Extracting Image of an Arbitrary Faultage

In the 3D image reconstructed by the gray scale value of voxel $g_{ijk}$, the image of an arbitrary faultage of the object interested can be extracted.

The present invention has the following advantageous effects:

1. The method of the present invention uses an ordinary digital X-ray machine for photography to obtain the data of 2D planar-shaped image of the object being taken, reconstructs a 3D image using the planar-shaped photographic image to obtain the image data of the whole object, which provides a technical solution of a different conception for the image reconstruction of the internal state of an object.

2. Compared with the determination of the path and position of X beam by the precise machinery slip ring for CT scanning, the method according to the present invention determines the path and position of X beam by computer calculation, which results in not only a high resolution, little X-ray exposure, but also an apparatus with simple structure, little investment and power consumption, and low requirement to the working environment.

3. The method in the present invention can not only reconstruct a 3D image of the object interested, but also can be used for 2D plain film observation, 2D digital subtraction, real-time 3D image observation, real-time 3D locating and navigation, 3D feature image extraction, image extraction of an arbitrary faultage, etc.

4. The method according to the present invention can be widely used in the field of internal inspection, security inspection custom inspection of the object interested, internal spatial locating and navigation, medical detection of the object interested, etc.

DESCRIPTION OF THE DRAWINGS

FIG. 8, FIG. 9, FIG. 10, and FIG. 11 are the X-ray digital photos at four different positions of the multi-layer wire frame, wherein.

In the figures, 1—X-ray tube center (X-ray source), 2—scanning gantry, 3—detector, 4—the object interested, 5—image reconstructing pane, 6—X-ray digital photo, 7—mark frame, 8—mark point, 9—bearing bed, 10—mark point pixel, 11—voxel pane.

DETAILED DESCRIPTION OF EXEMPLARY EMBODIMENTS

Hereinafter, the method in the present invention will be further described with reference to the accompanying drawings. In the following exemplary embodiments, steps of image reconstructing of the multi-layer wire frame using the X-ray volume photography are as follows:

(1) Checking an X-Ray Camera

Figure 4:
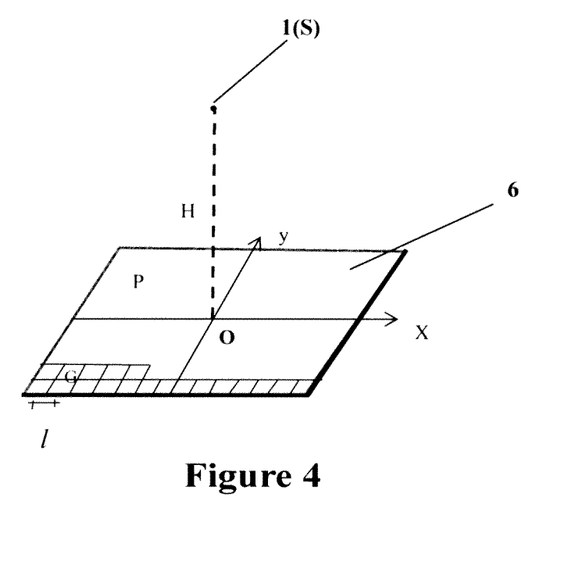
FIG. 4 is a schematic drawing of the photo coordinate system o-xy.
Figure 5:
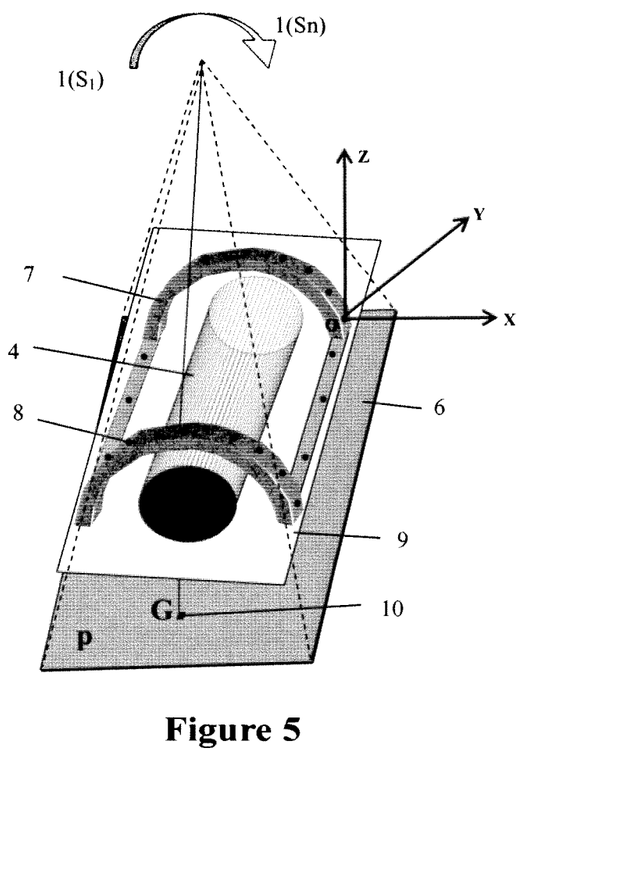
FIG. 5 is a positional relationship diagram of the X-ray source, the object interested, mark frame, X-ray digital photo in the X-ray volume photography, which also describes the mark point and the rectangular coordinate system O-XYZ for volume photographic 3D image reconstruction.
Figure 6:
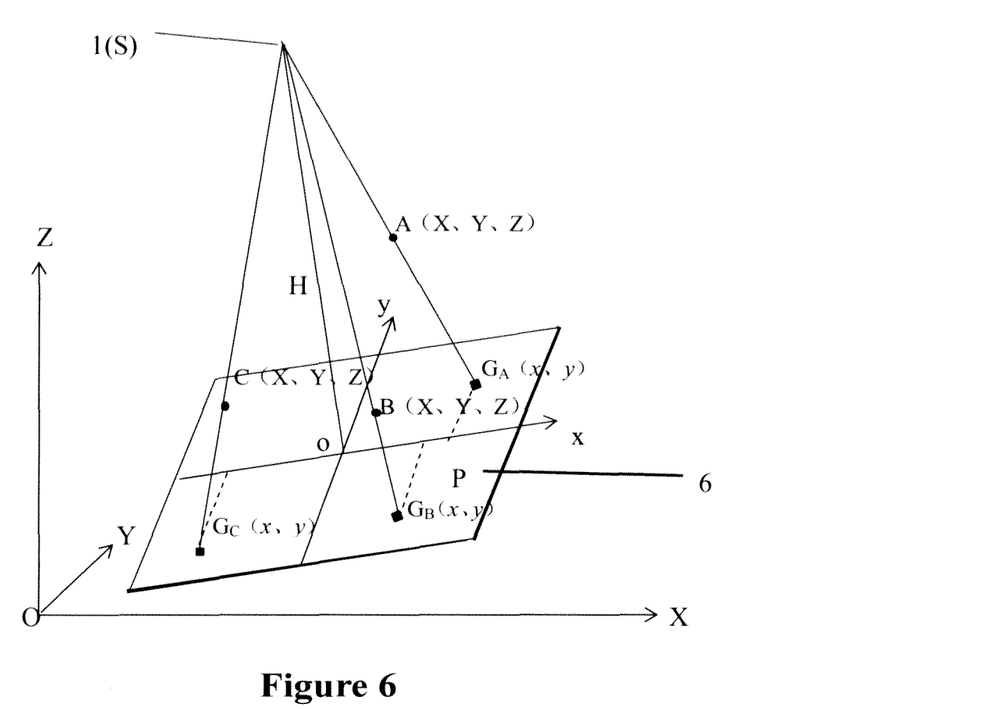
FIG. 6 is a relationship diagram between the photo coordinate system o-xy and the rectangular coordinate system O-XYZ for the volume photographic 3D image reconstruction.

An X-ray camera is adjusted to make a vertical beam of the X-ray tube center 1(S) perpendicular to the imaging surface of the X-ray digital photo, and then, the distance H from the X-ray tube center 1(S) to the imaging surface of the X-ray digital photo is determined to be 1000 mm (see FIG. 4).

(2) Constructing a Photo Coordinate System o-xy

A photo coordinate system o-xy is constructed on the X-ray digital photo 6, the origin o of the photo coordinate system being a pixel of the vertical beam of the X-ray tube center 1(S) on the X-ray digital photo, x axis of the photo coordinate system being the lateral arrangement direction of the pixels passing through the origin o of the photo coordinate system, y axis of the photo coordinate system being the vertical arrangement direction of the pixels passing through the origin o of the photo coordinate system, as shown in FIG. 4.

(3) Constructing the Rectangular Coordinate System O-XYZ for Volume Photographic 3D mage Reconstruction A plane mark frame is disposed using a multi-layer wire frame of 50×50×50 mm rolled of iron wire with a diameter of 0.5 mm. Eight mark points A, B, C, D, E, F, G and H are disposed on the mark frame and the 3D distance between every two mark points is measured. Mark point A is taken as the origin of the coordinate system to construct the rectangular coordinate system O-XYZ for volume photographic 3D image reconstruction. See Table 1 for the coordinates of each mark point in the coordinate system O-XYZ.

TABLE 1

The coordinates of each mark point in the coordinate system O-XYZ

| Mark point | Coordinates of mark points | | |
|---|---|---|---|
| | X | Y | Z |
| A | 101.00 | 100.00 | 0 |
| B | 150.00 | 102.00 | 0 |
| C | 202.00 | 101.50 | 0 |
| D | 249.00 | 100.00 | 0 |
| E | 100.00 | 300.50 | 0 |
| F | 153.50 | 303.50 | 0 |
| G | 200.00 | 302.50 | 0 |
| H | 251.50 | 301.50 | 0 |

The coordinates of each mark point in the coordinate system O-XYZ are stored into the computer that is a normal PC computer.

(4) X-Ray Photography

The X-ray camera is operated to make the X-ray tube and the imaging surface of the X-ray digital photo move along a straight-line track, taking one X-ray digital photo for each of the four sites with a distance of 50 mm so as to obtain four X-ray digital photos of the multi-layer wire frame at different positions (see FIG. 8, FIG. 9, FIG. 10 and FIG. 11).

(5) Recognizing the Pattern of the Mark Points and Locating the Image of the Mark Points All the four X-ray digital photos taken in step (4) is input into the computer described in step (3). The feature image of each mark point is extracted using matching calculation of operator Moravec for point feature extraction by the computer to determine the pixel position of each mark point in each X-ray digital photo so as to obtain the coordinates of each mark point in the o-xy coordinate system of each photo.

(6) Calculating the Orientation Elements $X_s, Y_s, Z_s, \alpha, \omega, \kappa$ of Each X-Ray Digital Photo The coordinates of the mark point of each X-ray digital photo in the rectangular coordinate system O-XYZ for volume photographic 3D image reconstruction and the coordinates of the mark point in the o-xy coordinate system obtained in step (5) are induced into the collinear equations for the X-ray beams, respectively. The collinear equations for the X-ray beams of three mark points in each X-ray digital photo are selected for simultaneous solution by the computer to calculate the six orientation elements of each X-ray digital photo (see Chapter 1 of "Analytical Photogrammetry" by Zengbo Qian for the calculating method, published by Surveying and Mapping Publishing House, 15039. new, 143,). See Table 2 for the orientation elements of each X-ray digital photo.

TABLE 2

The result table of the orientation element calculation

| Serial number of X-ray digital photo | Xs(mm) | Ys(mm) | Zs(mm) | α | ω | κ |
|---|---|---|---|---|---|---|
| 1 | 101.10 | 201.45 | 1000.43 | 0° 31' 21.32" | 0° 23' 57.63" | 2° 07' 32.72" |
| 2 | 151.02 | 201.35 | 1000.47 | 0° 31' 20.62" | 0° 23' 58.45" | 2° 07' 24.16" |
| 3 | 201.89 | 201.65 | 1000.65 | 0° 31' 19.14" | 0° 23' 56.34" | 2° 07' 21.42" |
| 4 | 251.74 | 201.63 | 1000.71 | 0° 31' 18.61" | 0° 23' 55.67" | 2° 07' 20.32" |

(7) Calculating the Coordinates of the Pixel G in the Rectangular Coordinate System O-XYZ for the Volume Photographic 3D Image Reconstruction According to the orientation elements $X_S, Y_S, Z_S, \alpha, \omega, \kappa$ of the four X-ray digital photo obtained in step (6) and the corrected distance $H_{corrected}$ ($H_{corrected}$=1000 mm) from the X-ray tube center 1(S) to the imaging surface of the X-ray digital photo, the distance l (l=100 μm) between pixels, the volume photographic 3D image reconstructing coordinates $X_{ij}, Y_{ij}, Z_{ij}$ of each pixel $G_{ij}$ on each X-ray digital photo is calculated by the computer. See Table 3 for volume photographic 3D image reconstructing coordinates $X_{ij}, Y_{ij}, Z_{ij}$ of the mark point pixel $G_{ij}$ on each X-ray digital photo.

TABLE 3

The coordinates of each mark point pixel $G_{ij}$ in the coordinate system O-XYZ

| Serial number of photos | Mark point | $X_{ij}$ | $Y_{ij}$ | $Z_{ij}$ |
|---|---|---|---|---|
| 1 | A | 101.23 | 100.44 | 0 |
|   | B | 149.96 | 102.08 | 0 |
|   | C | 201.97 | 101.55 | 0 |
|   | E | 99.67 | 300.50 | 0 |
|   | F | 153.65 | 303.11 | 0 |
|   | G | 199.98 | 302.25 | 0 |
| 2 | A | 101.05 | 100.29 | 0 |
|   | B | 150.12 | 101.98 | 0 |
|   | C | 202.07 | 101.65 | 0 |
|   | D | 249.20 | 99.80 | 0 |
|   | E | 99.74 | 300.60 | 0 |
|   | F | 153.75 | 303.23 | 0 |
|   | G | 199.86 | 302.21 | 0 |
|   | H | 251.51 | 301.87 | 0 |
| 3 | A | 101.00 | 100.11 | 0 |
|   | B | 150.12 | 101.98 | 0 |
|   | C | 202.00 | 101.45 | 0 |
|   | D | 249.10 | 99.60 | 0 |
|   | E | 99.52 | 300.47 | 0 |
|   | F | 153.85 | 303.43 | 0 |
|   | G | 199.86 | 302.21 | 0 |
|   | H | 251.32 | 301.61 | 0 |
| 4 | B | 150.12 | 101.98 | 0 |
|   | C | 201.95 | 101.98 | 0 |
|   | D | 249.310 | 99.75 | 0 |
|   | F | 251.51 | 301.87 | 0 |
|   | G | 199.92 | 302.21 | 0 |
|   | H | 251.58 | 301.77 | 0 |

(8) Determining all Voxels of Each Beam Passing the Multi-Layer Wire Frame

According to the orientation elements $X_s, Y_s, Z_s$ of each X-ray digital photo obtained in step (6) and the volume photographic 3D image reconstructing coordinates $X_{ij}, Y_{ij}, Z_{ij}$ of each pixel G on each X-ray digital photo obtained in step (7), it is calculated by the computer to obtain all voxels g of each X beam passing the multi-layer wire frame.

(9) Reconstructing a 3D Volume Image

Radon equation set is obtained based on the pixel G and the voxel g on each X beam path. The gray scale values of all voxels are calculated by the computer, and the 3D volume image of the multi-layer wire frame is reconstructed based on the gray scale values of the voxels.

In the above 3D image observation, the coordinates of the feature parts of the multi-layer wire layer and the mark points are measured, the image coordinates of the gray scale of voxel g is extracted to be compared with the coordinates of the feature parts of the multi-layer wire layer and the mark points measured on the spot, and they are completely matching. It proves that the image matching of the mark point pattern recognition and the mark point image locating is correct. The corresponding points of the forward intersection calculation formed by intersecting beams intersect in pairs. The calculation of the collinear condition is correct. The beam path formed by the X-ray projection center S and the photo coordinates of the pixel G satisfies the calculating condition of Radon.

The invention claimed is:
1. An image reconstructing method using X-ray volume photography, comprising the following steps:
   x-ray camera acquiring data of a plurality of X-ray area array images by taking photos of an object interested according to the locating principle of the digital photographic measurement, when taking an X-ray digital photo, simultaneously taking at least three mark points of which the 3D positions are known in the X-ray digital photo, wherein the at least three mark points are disposed on a plane mark frame;
   a computer using the coordinates of the mark points in a rectangular coordinate system for volume photographic 3D image reconstruction and the coordinates of the mark points in an X-ray photo coordinate system o-xy to construct a transforming relationship of the two coordinate systems, determining the path and the position of each X-ray photographic beam by using the transforming relationship, obtaining all voxels of each X-ray passing the object interested, determining the gray scale value of the voxel g by solving the Radon equation set based on a voxel g and a pixel G on the same X beam path, calculating the gray scale values of all voxels g, reconstructing a 3D volume image of the object interested based on the gray scale values of the voxels g;
   wherein the X-ray photo coordinate system o-xy is constructed by the following:
   constructing a photo coordinate system o-xy on the X-ray digital photo, the origin o of the photo coordinate system being a pixel of the vertical beam of an X-ray tube center S on the X-ray digital photo, x axis of the photo coordinate system being the lateral arrangement direction of the pixels passing through the origin o of the photo coordinate system, y axis of the photo coordinate system being the vertical arrangement direction of the pixels passing through the origin o of the photo coordinate system;
   wherein the rectangular coordinate system O-XYZ for volume photographic 3D image reconstruction is constructed by the following: disposing at least three mark points on the plane mark frame for the object interested and measuring the 3D distances between every two of the at least three mark points, taking an arbitrary mark point as the origin O of the coordinate system to construct the rectangular coordinate system O-XYZ for vol- ume photographic 3D image reconstruction, storing the coordinates of each mark point in the coordinate system O-XYZ into the computer.

2. The image reconstructing method using X-ray volume photography according to claim 1, wherein the steps in sequence are as follows:

(1) checking an X-ray camera adjusting the X-ray camera to make the vertical beam of an X-ray tube center S perpendicular to the imaging surface of the X-ray digital photo, and then, measuring a distance H from the X-ray tube center S to the imaging surface of the X-ray digital photo;

(2) constructing a photo coordinate system o-xy constructing a photo coordinate system o-xy on the X-ray digital photo, the origin o of the photo coordinate system being a pixel of the vertical beam of the X-ray tube center S on the X-ray digital photo, x axis of the photo coordinate system being the lateral arrangement direction of the pixels passing through the origin o of the photo coordinate system, y axis of the photo coordinate system being the vertical arrangement direction of the pixels passing through the origin o of the photo coordinate system;

(3) constructing the rectangular coordinate system O-XYZ for volume photographic 3D image reconstruction disposing at least three mark points for the object interested and measuring the 3D distances between every two mark points, taking an arbitrary mark point as the origin O of the coordinate system to construct the rectangular coordinate system O-XYZ for volume photographic 3D image reconstruction, storing the coordinates of each mark point in the coordinate system O-XYZ into the computer;

(4) X-ray photography operating the X-ray camera to make the X-ray tube and the imaging surface of the X-ray digital photo move along an arc-line or a straight-line track, taking X-ray digital photos of the object interested at sites with a fixed distance so as to obtain a plurality of X-ray digital photos of the object interested at different positions;

(5) recognizing the pattern of the mark points and locating the image of the mark points inputting all the X-ray digital photos taken in step (4) into the computer, performing pattern recognition and image locating to the mark points for each X-ray digital photo by the computer to obtain coordinates x, y of each mark point in the o-xy coordinate system of each photo;

(6) calculating the orientation elements $X_S$, $Y_S$, $Z_S$, $\alpha$, $\omega$, $\kappa$ of each X-ray digital photo obtaining collinear equations for the X-ray beams of all the mark points on each X-ray digital photo by the computer, selecting collinear equations for the X-ray beams of at least three mark points on each X-ray digital photo for simultaneous solution to obtain the six orientation elements $X_S$, $Y_S$, $Z_S$, $\alpha$, $\omega$, $\kappa$ of each X-ray digital photo;

(7) calculating the coordinates of the pixel G in the rectangular coordinate system O-XYZ for the volume photographic 3D image reconstruction according to the orientation elements $X_s$, $Y_s$, $Z_s$, $\alpha$, $\omega$, $\kappa$ of each X-ray digital photo obtained in step (6) and a corrected distance $H_{corrected}$ from the X-ray tube center S to the imaging surface of the X-ray digital photo, a distance/between pixels, calculating volume photographic 3D image reconstructing coordinates $X_{ij}$, $Y_{ij}$, $z_{ij}$ of each pixel $G_{ij}$ on each X-ray digital photo by the computer, the corrected distance $H_{corrected}$ being calculated by using the collinear equations for the X-ray beams of the mark points on the X-ray digital photo;

(8) determining all voxels of each beam passing the object interested according to the orientation elements $X_s$, $Y_s$, $Z_s$ of each X-ray digital photo obtained in step (6) and the volume photographic 3D image reconstructing coordinates $X_{ij}$, $Y_{ij}$, $Z_{ij}$ of each pixel G on each X-ray digital photo obtained in step (7), calculating by the computer to obtain all voxels g of each X beam passing the object interested;

(9) reconstructing a 3D volume image obtaining Radon equation set based on the voxel g and the gray scale value of the pixel G on each X beam path, calculating the gray scale values of all voxels g by the computer, reconstructing the 3D volume image of the object interested based on the gray scale values of the voxels.

3. The image reconstructing method using X-ray volume photography according to claim 2, wherein the mark points are disposed on the object interested or a mark frame, wherein the mark frame is disposed surrounding the object interested.

* * * * *